United States Patent [19]

Strickland

[11] 4,336,537
[45] Jun. 22, 1982

[54] BI-DIRECTIONAL UNDERWATER COMMUNICATION SYSTEM

[76] Inventor: Fredrick G. Strickland, NAVSPECWARUNIT ONE Box 37, c/o FPO, San Francisco, Calif. 96651

[21] Appl. No.: 217,270

[22] Filed: Dec. 17, 1980

[51] Int. Cl.³ .......................................... H04B 11/00
[52] U.S. Cl. .............................. 340/850; 179/1 UW; 367/132; 343/709; 343/877; 455/89
[58] Field of Search ............... 340/850; 343/709, 877; 367/132; 179/1 UW; 455/89, 97, 99, 100

[56] References Cited

U.S. PATENT DOCUMENTS

| | | | |
|---|---|---|---|
| 3,230,500 | 1/1966 | Dunn | 340/5 |
| 3,267,414 | 8/1966 | Kritz | 367/132 X |
| 3,337,841 | 8/1967 | Wainwright et al. | 340/5 |
| 3,451,039 | 6/1969 | Epstein et al. | 340/5 |
| 3,469,231 | 9/1969 | Geiling et al. | 340/6 |
| 3,788,255 | 1/1974 | Tennyson | 340/850 X |
| 3,789,353 | 1/1974 | Hunter et al. | 367/132 |
| 3,958,215 | 5/1976 | Bianco | 340/5 R |
| 3,961,589 | 6/1976 | Lombardi | 343/709 X |
| 4,119,941 | 10/1978 | Moore et al. | 340/5 R |
| 4,154,981 | 5/1979 | Dewberry et al. | 179/1 P |
| 4,203,109 | 5/1980 | Ballard et al. | 340/850 |

FOREIGN PATENT DOCUMENTS 367278 2/1932 United Kingdom ............... 340/850

Primary Examiner—Richard A. Farley
Attorney, Agent, or Firm—Robert F. Beers; Ervin F. Johnston; Terrance A. Meador

[57] ABSTRACT

A bi-directional underwater communication system provides a submerged operator with the capability to communicate with a surface site. A face-mask-mounted microphone and an earphone are connected to a submerged, watertight radio. The radio antenna cable is carried by a buoy to the surface of the body of water in which the operator is submerged.

5 Claims, 7 Drawing Figures

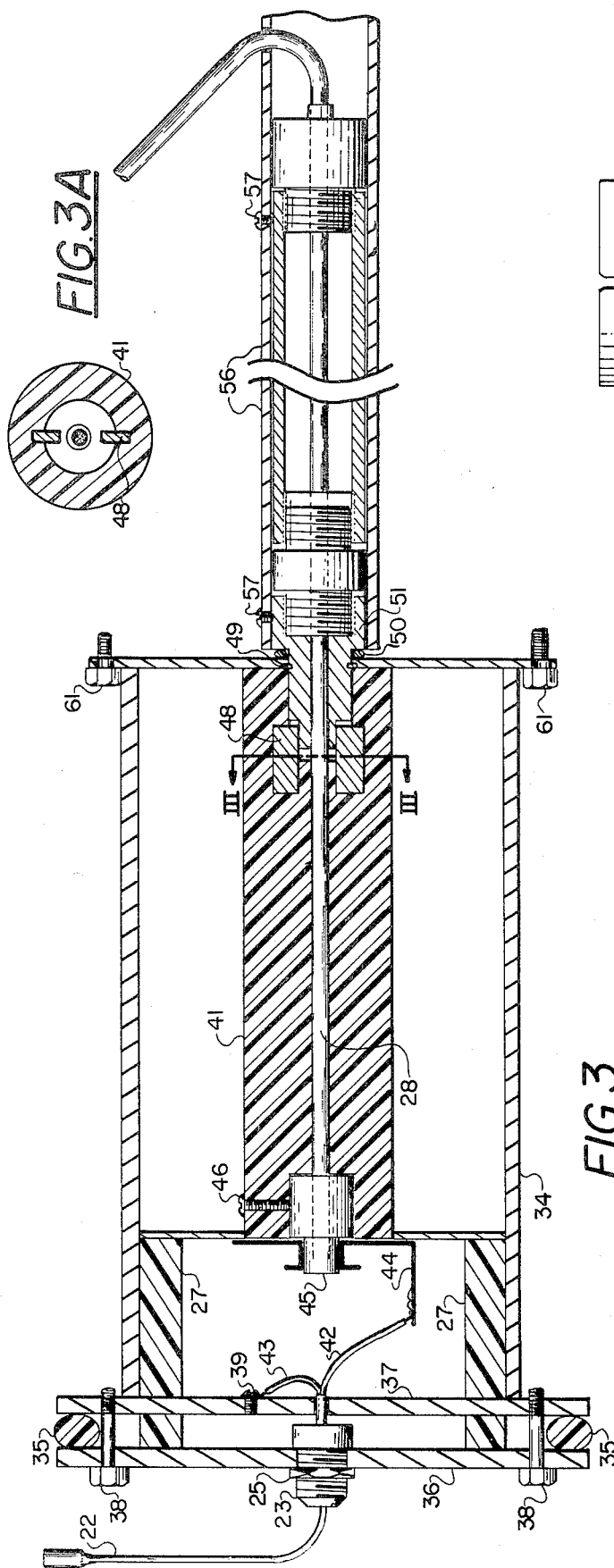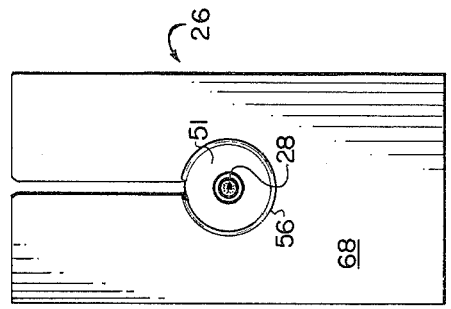

BI-DIRECTIONAL UNDERWATER COMMUNICATION SYSTEM

STATEMENT OF GOVERNMENT INTEREST

The invention described herein may be manufactured and used by or for the Government of the United States of America for governmental purposes without the payment of any royalties thereon or therefor.

BACKGROUND

This invention relates to radio communication systems, and more particularly to underwater radio communication systems which provide a submerged operator the capability to engage in two-way oral communications with a station on the surface.

Small, maneuverable underwater vehicles manned by operators with scuba support systems are in extensive use by the Navy for portage and delivery of personnel and equipment. Such craft are normally transported to a deployment site on a surface control craft, placed in the water, and submerged and operated in the vicinity of the surface craft. Command control of such vehicles by the surface craft is desirable from the standpoints of operational safety and effectiveness. A two-way communication link is necessary to effect the command and control capability.

Communication links which satisfy this objective have been provided either through a direct umbilical link between the surface and submerged crafts or through a sonar link. The tethered, umbilical link limits the range and maneuverability of the undersea vehicle as does the directionality of the sonar link. A two-way communication link utilizing radio broadcast techniques is obviously desirable from the standpoint of enhancing the freedom of movement of the undersea vehicle as well as providing omni-directionality to the communication link.

SUMMARY OF THE INVENTION

The present invention provides a submergible, watertight radio transceiver which may be mounted upon an underwater delivery vehicle. The operator of the vehicle is provided with a remote, watertight microphone connected to the transceiver and adapted to enable him to transmit and receive oral communications by means of the transceiver. An antenna cable, attached at one end to a buoy and operatively connected at the other end to the transceiver, is releasably attached to the underwater vehicle and may be released therefrom to float to the surface thereby enabling the transceiver to radiate and detect electromagnetic signals.

OBJECTS OF THE INVENTION

An object of the present invention is to provide a bi-directional radio link between an underwater operator and a vessel on the surface of the body of water in which the operator is submerged.

A further object is to provide a submergible two-way communication link between a free-swimming, non-tethered underwater vehicle and a surface control craft.

These and other objects of the invention will become more readily apparent from the ensuing specification when taken together with the drawings.

DESCRIPTION OF THE DRAWINGS

FIG. 3 is a sectional side view of a waterproof rotating electrical contact used in the antenna reel of the invention.

FIG. 3a is a view taken along plane I—I of FIG. 3.

FIG. 4b is a view of the opposite end of the antenna reel used in the invention.

DESCRIPTION OF THE PREFERRED EMBODIMENT

Figure 1:
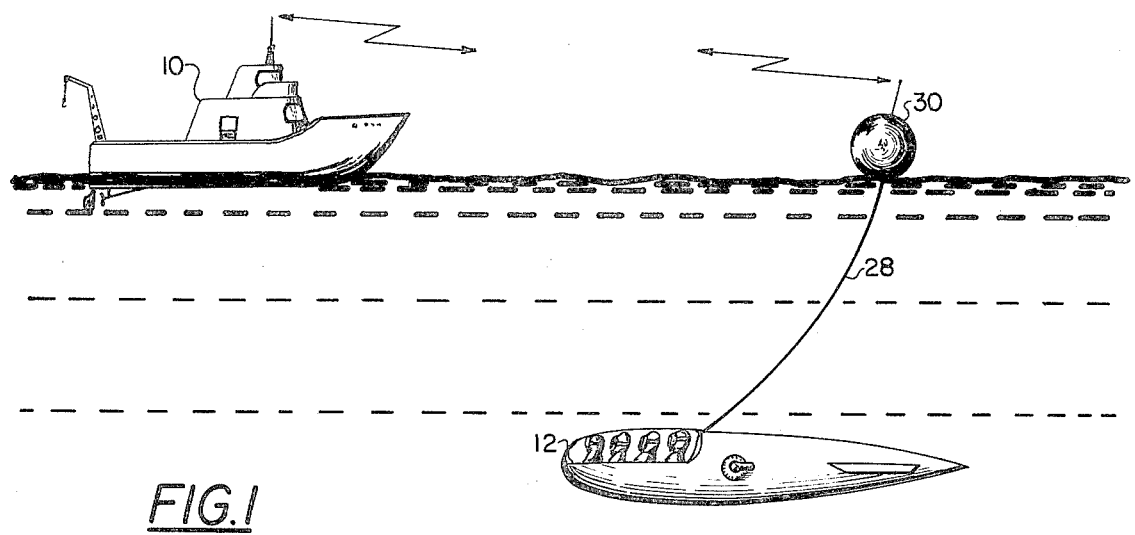
FIG. 1 is an ocean elevation view of an embodiment of the present invention mounted on an underwater delivery vehicle.

Referring now to FIG. 1, there is shown a surface craft 10 engaging in two-way radio communication with an undersea delivery vehicle 12 upon which is mounted the invention. A watertight radio transceiver, not shown, is mounted on the underwater vehicle 12 and is provided with antenna 28 carried to the surface of a body of water by a releasable buoy 30. The underwater vehicle 12 has an open cockpit with space for four divers, one of whom operates the vehicle and the transceiver. With the antenna 28 thus deployed, bi-directional communication can be established between the surface craft 10 and the underwater vehicle 12 for the purposes of establishing operational command and control over the vehicle 12.

Figure 2:
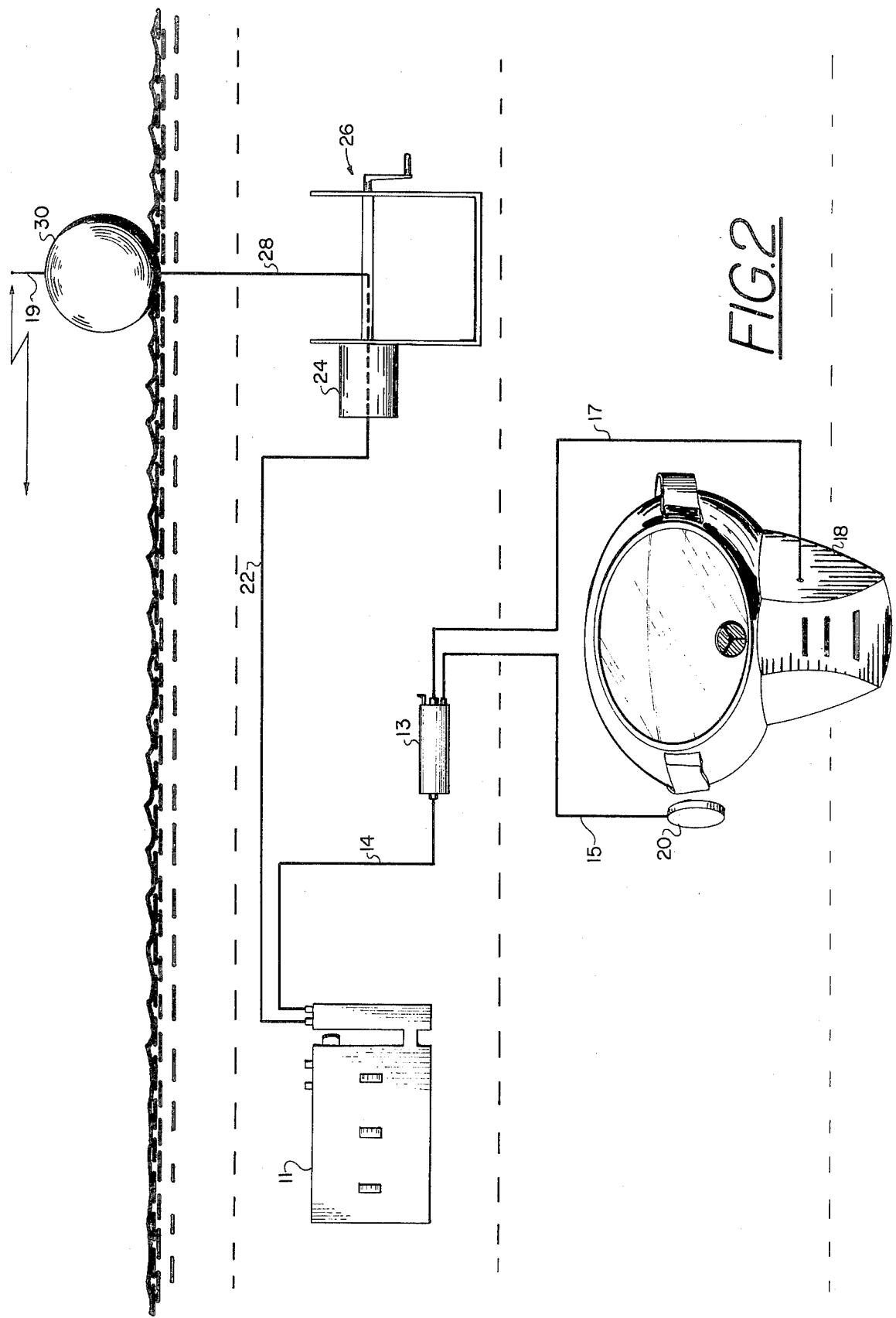
FIG. 2 is a block diagram of the invention in a deployed configuration.

Referring now to FIG. 2, there is shown in block diagram form the major components which comprise the invention. A watertight radio 11 is provided for mounting in the cockpit of the underwater vehicle 12. An antenna cable 22 connects the radio 11 to a waterproof rotatable contact 24 which is mounted on cable reel 26. Antenna cable 28, electrically connected to the cable 22 through the contact 24, is attached to cable reel 26 with which it can be reeled and unreeled. Buoy 30 will carry the free end of antenna cable 28 to the surface of any body of water in which the undertight vehicle 12 may be submerged. A radiative section 19, electrically continuous with the cable 28, can be provided within or on buoy 30 to allow the transceiver 11 to radiate or detect electromagnetic waves above the surface.

The operator, submerged in the open cockpit of the underwater vehicle 12, has communication access to the transceiver 11 by means of a face-mask-mounted microphone 18 and an earphone 20. The transceiver 11 can be keyed between a transmit and a receive mode by the operator by means of keying switch 13. A transmit/receive cable 14 interconnects the transceiver 11 and the keying switch 13; transmit cable 17 and receive cable 15 interconnect the keying switch 13 with the microphone 18 and the earphone 20, respectively.

The radio transceiver 11 may, for example, comprise a PRC-77 radio, in use by the U.S. Armed Forces, encased in a waterproof container. Watertight connectors may be provided on the surface of the watertight container for necessary external cabling; manual controls may also be provided to allow an operator to adjust the volume, change the transmission channel, and switch the radio on and off.

The prior art contains numerous examples of divers face masks fitted with microphones as well as examples of earphones suitable for use underwater. See, for example, U.S. Pat. No. 3,267,414 and U.S. Pat. No. 3,789,353.

A watertight rotating contact suitable for connecting antenna cable 22 with antenna cable 28 is illustrated in FIG. 3. Antenna cable 22 is terminated in threaded plug 23 which screws into cover plate 36 and is held thereto by watertight threaded nut 25. Cover plate 36 is held to the top flange 37 of container 34 by means of a series of threaded screws 38, two of which are illustrated. O-ring 35 provides a watertight seal between cover plate 36 and flange 37. Cylindrical teflon dowel 27 is attached to cover plate 36. Such attachment can be by, for example, a series of threaded screws, not shown, or by an adhesive. Copper contact plate 44 is centered on and attached to the bottom of teflon dowel 27. A walled cylindrical opening is provided in the copper contact plate 44 to form a surface which can be electrically contacted by a conductive rotating contact 45. The live lead 42 of antenna cable 22 is connected to a flange of the copper contact plate 44. The ground lead 43 of antenna cable 22 is grounded on the flange 37 of container 34 by grounding screw 39. The rotating conductive contact 45 is held in a cylindrical teflon dowel 41 by set screw 46. An axial passageway is provided in teflon dowel 41 for antenna cable 28 the live lead of which is soldered to the rotating conductive contact 45. The teflon dowel 41 is coaxially centered in the container 34 which has an aperture on its bottom which admits the narrow neck of shaft piece 51. Teflon dowel 41 and shaft piece 51 are caused to turn in unison by two keys 48 shown in FIG. 3a which are in embedded in the dowel 41 and which extend into grooves in the tip of the neck of shaft piece 51. A sureclip 49 holds the shaft piece 51 to the container 34. An o-ring 50 provides a watertight seal between the shaft piece 51 and the container 34. The shaft piece 51 comprises four interlocking threaded parts which, when assembled, slidably fit within the hollow antenna cable reel spindle 56 and are held thereto by locking screws 57. The antenna cable 28 fits into the central cavity of the shaft piece 51 extending therethrough to the teflon dowel 41 and the rotating contact 45. A watertight seal 58 which may be, for example, a threaded nut and o-ring or a potted seal, provides moisture resistance at the end of the shaft piece 51 where the antenna cable 28 enters it. The waterproof rotating contact 24 can be held to the antenna cable reel 26 by threaded bolts 61.

Figures 4, 4A:
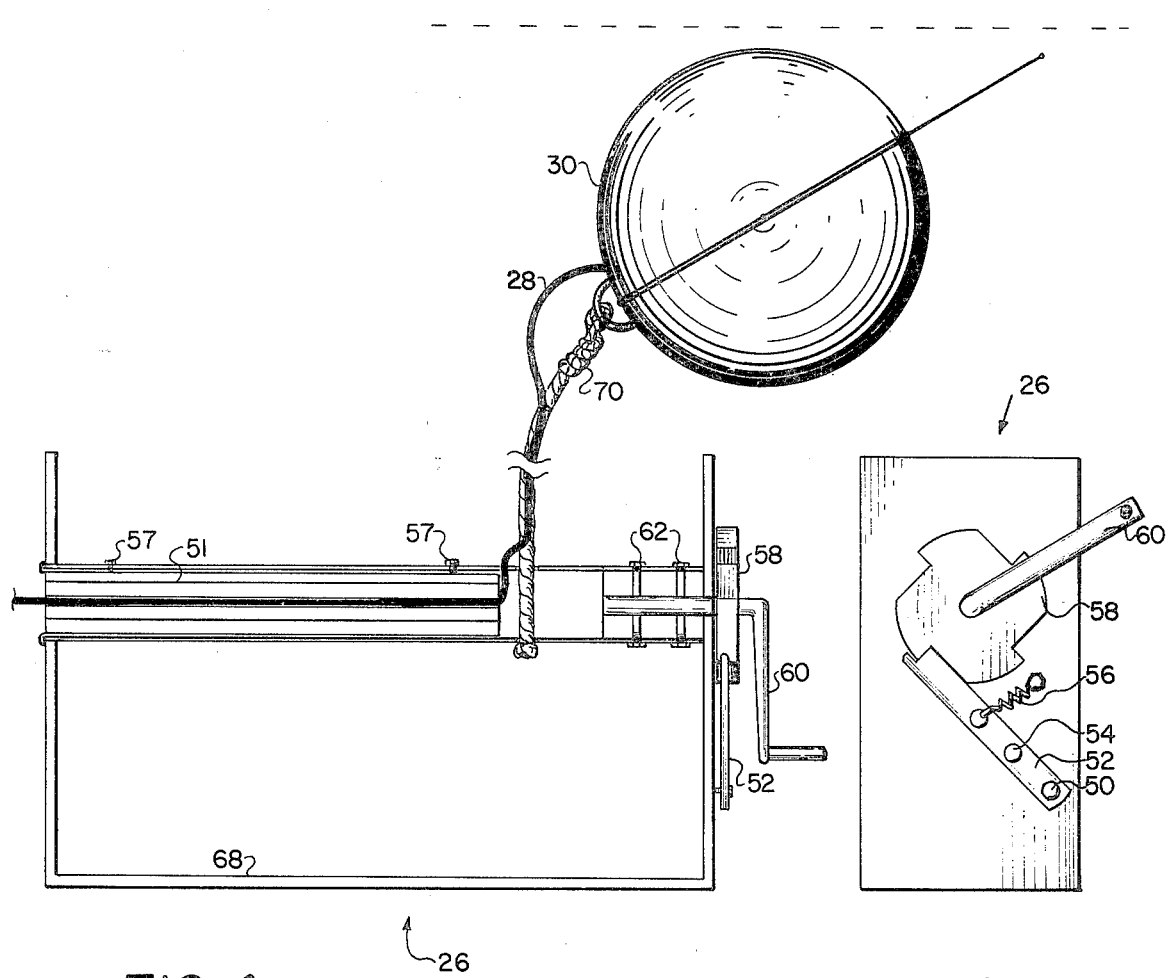
FIG. 4 is a partial sectional side view of the antenna reel used in the invention.
FIG. 4a is a view of one end of the antenna reel used in the invention.

With reference now to FIGS. 4, 4a and 4b, the antenna cable spindle 56 extends at one end through a hole provided in the body 68 of the antenna cable reel 26. At the other end it is connected to the reel crank 60 by a pair of threaded bolts 62. The reel crank 60 is welded to a notched stop wheel 58 which is engaged by a release lever 52. The release lever 52 is attached to the body 68 of the antenna cable reel 26 by swivel screw 50 and engages the notched wheel 58 under the force of spring 56. The lever 52 is disengaged from the notched wheel 58 when pressure is applied to the release screw 54. A buoy towline 70 secures the antenna buoy 30 to the antenna cable reel 26. The antenna cable 28 is coaxially contained within the buoy towline 70 as shown in FIG. 4.

Operation of the preferred embodiment occurs when the underwater vehicle is submerged. An operator in the cockpit of the vehicle compresses the release screw 54 on the stop lever 52 which disengages the lever from stop wheel 58, allowing the antenna buoy 30 to rise to the surface. The rising buoy 30 provides the unwinding force which extends the antenna cable 28 from the vehicle to the surface of the body of water in which it is submerged. With the antenna thus deployed, the operator can monitor radio activity through his earphone. Subsurface-to-surface voice communication is accomplished by depressing the switch provided on keying switch 13 and speaking into the face-mask-mounted microphone 18. Signals are transmitted through the radio transceiver 11 by means of electrically continuous antenna cable 22 and 28. Two-way voice communication between the vehicle and a point above the surface of the water may thus be maintained for varying depths to which the vehicle might be submerged by reeling and unreeling the antenna 28 by means of the antenna cable reel 26.

Obviously, many modifications and variations of the present invention are possible in light of the above teachings, and, it is therefore understood that within the scope of the disclosed inventive concept, the invention may be practiced otherwise than specifically described.

I claim:

1. A system for bi-directional radio communication between a diver and a remote location comprising:
   a separate watertight radio transceiver;
   watertight microphone means operatively connected to the transceiver for transmitting and receiving voice communication;
   a face mask for the diver;
   the watertight microphone means including a separate earphone worn in the ear of the diver and a separate mouth piece mounted in the facemask;
   buoyant antenna means operatively connected by a cable to the transceiver for floating at the surface of a body of water;
   said buoyant antenna means including a buoy having top and bottom ends and an antenna which is mounted on the top of the buoy for extending upwardly therefrom above the water; and
   reel means interconnected in the cable between the transceiver and the buoyant antenna means in proximity to the diver for reeling and unreeling the cable so that the antenna can remain above the surface of the water while the transceiver is submerged at various depths.

2. A system as in claim 1 further comprising:
   the reel means including a drum exposed to the water and a watertight electrical coupling mounted to the drum and interconnected in the cable for breaking twist of the cable when the drum is rotated.

3. A system as in claim 2 further comprising:
   a handle connected the drum for operation by the diver; and
   ratchet means connected to the drum for stopping upward movement of the buoyant antenna means; and
   means for selectively releasing the ratchet means.

4. A system as in claim 3 further comprising:
   keying means interconnected in the cable between the transceiver and the microphone means for providing the operator the ability to switch the system between a transmitting function and a receiving function.

5. A system as in claim 4 further comprising:
   an underwater free flooded vehicle for carrying the diver; and
   the reel means and transceiver being mounted on the underwater vehicle.

* * * * *